Patented Dec. 5, 1944

2,364,338

UNITED STATES PATENT OFFICE 2,364,338

PRESERVATION OF RUBBER

David J. Beaver, St. Albans, W. Va., assignor to Monsanto Chemical Company, St. Louis, Mo., a corporation of Delaware No Drawing. Application April 15, 1942,
Serial No. 439,127

22 Claims. (Cl. 260—810)

The present invention relates to the art of rubber manufacture, and particularly relates to rubber compositions which resist deterioration due to aging or to exposure to the atmosphere. It has long been known that such deterioration can be greatly retarded by treating the rubber before or after vulcanization with certain substances known as age-resisters or antioxidants. One object of this invention is to provide a superior class of antioxidants for rubber.

The age resisting characteristics of a vulcanized rubber product can be readily ascertained by subjecting samples of the vulcanized product in a bomb to the action of air or oxygen under elevated pressure. The aged rubber samples are then examined and tested and the test data compared with the results obtained on testing the unaged rubber samples. The deterioration in properties effected as a result of the oxidation is indicative of the result that would normally be expected of that particular stock during actual service. Such a test produces an effect on a vulcanized rubber stock comparable with that resulting from several years of natural aging of the rubber depending upon the conditions of the test.

The stabilizing agents of the present invention belong to the class of hydroxy substituted aromatic thio ethers also known as phenol sulfides. My prior application Serial No. 395,445, filed May 27, 1941, of which the present application is a continuation-in-part reveals that sulfides of mono hydric dialkyl phenols in which at least one of the alkyl groups contains more than two carbon atoms are valuable non-discoloring antioxidants. In accordance with the present invention it has been discovered that the compounds belonging to this class of phenolic sulfides the sulfides of dialkyl mono-hydric phenols in which at least two of the positions ortho and para to the hydroxy group are unsubstituted except by sulfur comprise a particularly efficacious group and are markedly superior to sulfides derived from dialkyl phenols wherein only one or not any of these positions are unoccupied or where both the alkyl groups contain less than three carbon atoms or where only one alkyl group is present.

Typical examples of compounds coming within the purview of this invention comprise di(1-hydroxy 3-methyl 6-isopropyl phenyl) monosulfide and disulfide, di(1-hydroxy 3-methyl 6-tertiary butyl phenyl) monosulfide and disulfide, di(1-hydroxy 2-tertiary butyl 5-methyl phenyl) monosulfide and disulfide, di(1-hydroxy 2-tertiary amyl 5-methyl phenyl) monosulfide and disulfide, di(1-hydroxy 2-methyl 5-isopropyl phenyl) monosulfide and disulfide, di(1-hydroxy 2-methyl 5-tertiary butyl phenyl) monosulfide and disulfide, di(1-hydroxy 2-methyl 5-tertiary amyl phenyl) monosulfide and disulfide, di(1-hydroxy 3-methyl 4-tertiary butyl phenyl) monosulfide and disulfide, di(1-hydroxy 3-methyl 4-isopropyl phenyl) monosulfide and disulfide, di(1-hydroxy 3-methyl 4-tertiary amyl phenyl) monosulfide and disulfide, di(1-hydroxy 3-tertiary butyl 4 methyl phenyl) monosulfide and disulfide, di(1-hydroxy 3-isopropyl 4 methyl phenyl) monosulfide and disulfide, di(1-hydroxy 3,6-di-tertiary butyl phenyl) monosulfide and disulfide, di(1-hydroxy 2,5 di-tertiary butyl phenyl) monosulfide and disulfide, di(1-hydroxy 2-methyl 3 isopropyl phenyl) monosulfide and disulfide, di(1-hydroxy 2-methyl 3-tertiary butyl phenyl) monosulfide and disulfide, di(1-hydroxy 3,5 di tertiary butyl phenyl) monosulfide and disulfide, di(1-hydroxy 3,5 di tertiary amyl phenyl) monosulfide and disulfide, di(1-hydroxy 3-methyl 5-isopropyl phenyl) monosulfide and disulfide, di(1-hydroxy 3-methyl 5-tertiary butyl phenyl) monosulfide and disulfide, di(1-hydroxy 3-methyl 5-tertiary amyl phenyl) monosulfide and disulfide, di(1-hydroxy 3-methyl 4 secondary butyl phenyl) monosulfide and disulfide, di(1-hydroxy 3-methyl 4 isoamyl phenyl) monosulfide and disulfide and equivalents and analogues thereof. It is significant that di(1-hydroxy 2 methyl 4 tertiary butyl phenyl) disulfide was found not to possess the superior antioxidant properties characteristic of the preferred class.

Since the preferred age resisters are advantageously employed in white rubber goods, constituents which discolor rubber as for example amino and other strongly basic constituents should be absent. Strongly acidic groups affect the cure but a halogen substituent may be present.

Members of the preferred class of age resisters can be obtained by the action of sulfur monochloride ($S_2Cl_2$) or sulfur dichloride ($SCl_2$) on the dialkyl aromatic hydroxy compound. Where convenient or desirable other methods of synthesis may be used, and it is to be understood that this invention is not limited to any method of synthesis but pertains broadly to the use of the materials as age resisters. However, it may be pointed out that since more than one position at which the sulfur may attach to the ring is available, more than a single reaction product may be formed, and it is within the purview of this invention to employ the composite reaction products directly as antioxidants. For example thymol and carvacrol react readily with sulfur dichloride in an organic solvent to produce crystalline solids M. P. (purified) 152–153° C. and 171–172° C. respectively and minor amounts of other material which remains in the organic solvent. If the solvent is evaporated off without separating the crystalline solid, a composite resinous reaction product remains which possesses nearly the same antioxidant strength as the crystalline solid and has substantially no discoloring effect on the cured stocks. Similarly, 4-tertiary butyl meta cresol reacts with sulfur dichloride in ether solution producing a crystalline solid melting at 157–158° C. and an even larger proportion of resinous reaction product. Again the composite reaction product was found to possess nearly the same antioxidant strength as the pure crystalline compound and did not discolor the rubber.

A method of preparation which was found to give good results comprises adding a solution of sulfur monochloride or dichloride in carbon tetrachloride or other suitable solvent to a rapidly stirred solution of the phenol in the same solvent. The reactions are usually instantaneous and take place with little evolution of heat. The mixture is then cooled to precipitate out the crystalline material and filtered, or where the product is a liquid or where it is desired to isolate the composite reaction product, the solvent is simply removed by evaporation or other suitable means. Products having antioxidant properties were obtained, for example, by the interaction of sulfur dichloride and 1,3,5 xylenol, p-tertiary amyl phenol, p-chlor m-cresol, 3,5 dimethyl 4 chlor phenol, o-benzyl phenol, p-chlor phenol, 8 hydroxy quinoline, the mono benzyl ether of catechol, p-chlor o-cresol and 3 methyl 4,6 tertiary butyl phenol.

As specific embodiments of the invention rubber stocks containing typical members of the preferred class of preservatives were compounded from a white rubber base mix,

|  | Base mix | A | B |
|---|---|---|---|
|  | Parts by weight | Parts by weight | Parts by weight |
| Pale crepe rubber | 100 | 100 | 100 |
| Zinc oxide | 60 | 60 | 60 |
| Lithopone | 20 | 20 | 20 |
| Sulfur | 2 | 2 | 2 |
| Benzothiazyl thiol benzoate | 0.825 | 0.825 | 0.825 |
| Diphenyl guanidine phthalate | 0.675 | 0.675 | 0.675 |
| Paraffin | 0.25 | 0.25 | 0.25 |
| Di(1-hydroxy 3 methyl 4 tertiary butyl phenyl) monosulfide |  | 1.0 |  |
| Di(1-hydroxy 2-methyl 5 isopropyl phenyl) monosulfide |  |  | 1.0 |

The rubber mixtures were then vulcanized in a press at the temperature of twenty pounds steam pressure per square inch and artifically aged by heating in a bomb under 80 pounds air pressure per square inch and at 250° F. The tensile strength of the cured rubber products before and after aging are set forth below:

Table I

| Stock | Cure time in mins. | Hrs. aged | Tensile strength in lbs./in.² | Ultimate elongation, percent |
|---|---|---|---|---|
| Base mix | 30 | 0 | 4,400 | 685 |
| A | 30 | 0 | 4,370 | 700 |
| B | 30 | 0 | 4,250 | 670 |
| Base mix | 30 | 6 | 560 | 295 |
| A | 30 | 6 | 2,490 | 555 |
| B | 30 | 6 | 2,450 | 545 |
| Base mix | 45 | 0 | 4,180 | 665 |
| A | 45 | 0 | 4,070 | 670 |
| B | 45 | 0 | 4,175 | 650 |
| Base mix | 45 | 6 | 875 | 480 |
| A | 45 | 6 | 2,550 | 580 |
| B | 45 | 6 | 2,400 | 575 |
| Base mix | 60 | 0 | 4,210 | 660 |
| A | 60 | 0 | 4,400 | 685 |
| B | 60 | 0 | 4,200 | 660 |
| Base mix | 60 | 6 | 755 | 490 |
| A | 60 | 6 | 2,485 | 575 |
| B | 60 | 6 | 2,300 | 560 |

The above data show the superior age resisting properties imparted to rubber by the preferred class of materials and illustrate the enormous improvement over a stock containing no antioxidant. In addition samples of the cured stocks were exposed to a sunlamp for 74 hours. At the end of the exposure only a slight discoloration of the stocks containing an antioxidant had taken place.

As further specific embodiments of the invention illustrating the superior preservative action of the new and improved class of compounds, other stocks were prepared by adding 1.0 part by weight of a phenol sulfide to the base mix described above. The stocks so compounded were vulcanized in the usual manner at the temperature of twenty pounds steam pressure per square inch and artifically aged by heating for four hours in a bomb under eighty pounds air pressure per square inch and at 250° F. The tensile strengths of the aged rubber products were determined in the usual manner and the superiority over the base mix noted. For convenience the tensile strength of the base mix, i. e. the stock containing no antioxidant, was arbitrarily taken as 100 and the actual tensiles of the stocks containing a phenol sulfide divided by the actual tensiles of the base stock and multiplied by 100 to give a comparative rating. The figures given below are therefore ratios of the tensile strength at break of the stocks containing an antioxidant to that of the same stock without an antioxidant. They set forth directly the extent of the protection provided by the antioxidant.

Table II

| Antioxidant | Ratio of aged tensiles in— | | |
|---|---|---|---|
|  | 30 min. cures | 45 min. cures | 60 min. cures |
| None | 100 | 100 | 100 |
| 1. Reaction product resorcinol and S₂Cl₂ | 93 | 100 | 71 |
| 2. Di(β hydroxy naphthyl) disulfide | 127 | 139 | 141 |
| 3. Di(β hydroxy naphthyl) monosulfide | 116 | 114 | 97 |
| 4. 4,4′ dioxy diphenyl monosulfide | 125 | 149 | 126 |
| 5. Di(hydroxy tolyl) monosulfide | 159 | 170 | 154 |
| 6. Di(1-hydroxy 3-methyl 6-isopropyl phenyl) monosulfide | 323 | 385 | 292 |
| 7. Di(1-hydroxy 2-methyl 5-isopropyl phenyl) monosulfide | 303 | 348 | 283 |
| 8. Di(1-hydroxy 2-benzyl phenyl) monosulfide | 158 | 146 | 138 |

The superiority of hydroxy aromatic sulfides prepared from dialkyl mono hydric phenols in which two of the three positions para and ortho to the hydroxy group are unoccupied is clearly shown by the above data.

Obviously practice of this invention is not limited to the specific compositions given above, such compositions being merely illustrative of the manner of employing the antioxidants or age resisters of this invention. The antioxidants or age resisters may be employed in conjunction with other vulcanizing agents than those specifically disclosed for this invention is applicable generally to pure rubber or rubber compositions of the most varied nature. Furthermore the preferred class of materials may be employed in conjunction with other accelerators than those specifically shown with varying differences in tensile and modulus properties but still exhibiting the desirable properties of the class.

It is to be understood that the preferred class of materials may be incorporated into the rubber by milling or similar process, or may be added to the rubber latex before its coagulation, or applied to the surface of a mass of crude or vulcanized rubber and that the term "treating" as employed in the claims is used in this generic sense.

The term "a rubber" is employed in the claims to define a sulfur vulcanizable plastic material which possesses high extensibility under load coupled with the property of forcibly retracting to approximately its original size and shape after the load is removed. Such products include for example natural rubber including reclaimed rubber, balata and gutta percha and synthetically prepared rubbers as for example Hycar, Perbunan and Buna S all of which are said to be polymers or co-polymers of butadiene. These and other natural or synthetically prepared sulfur vulcanizable products which deteriorate upon aging are included whether or not admixed with fillers, pigments or accelerating agents.

The present invention is limited solely by the claims attached hereto as part of the present specification.

What is claimed is:

1. The method of preserving a rubber which comprises treating a rubber with a sulfide of a monohydric dialkyl phenol in which a carbon atom of each of two nuclei of the phenol are joined together by less than three sulfur atoms and the alkyl groups contain less than six carbon atoms and at least one alkyl group is a branched chain alkyl group and which is unsubstituted, except for sulfur, in two of the positions ortho and para to the hydroxy group.

2. The method of preserving a rubber which comprises treating a rubber with a mono sulfide of an alkyl cresol in which said alkyl group is a branched chain containing less than six carbon atoms and which is unsubstituted, except for sulfur, in two of the positions ortho and para to the hydroxy group.

3. The method of preserving a rubber which comprises treating a rubber with a monosulfide of a tertiary alkyl cresol which is unsubstituted, except for sulfur, in two of the positions ortho and para to the hydroxy group.

4. The method of preserving a rubber which comprises treating a rubber with di(1-hydroxy 2-methyl 5-isopropyl phenyl) monosulfide.

5. The method of preserving a rubber which comprises treating a rubber with di(1-hydroxy 3-methyl 4-tertiary butyl phenyl) monosulfide.

6. The method of preserving natural rubber which comprises treating natural rubber with a sulfide of a monohydric dialkyl phenol in which a carbon atom of each of two nuclei of the phenol are joined together by less than three sulfur atoms and the alkyl groups contain less than six carbon atoms and at least one alkyl group is a branched chain alkyl group and which is unsubstituted, except for sulfur, in two of the positions ortho and para to the hydroxy group.

7. The method of preserving natural rubber which comprises treating natural rubber with di-(1-hydroxy 2-methyl 5-isopropyl phenyl) monosulfide.

8. The method of preserving natural rubber which comprises treating natural rubber with di(1-hydroxy 3-methyl 4-tertiary butyl phenyl) monosulfide.

9. The vulcanized rubber product obtained by heating a rubber and sulfur in the presence of a sulfide of a monohydric dialkyl phenol in which a carbon atom of each of two nuclei of the phenol are joined together by less than three sulfur atoms and the alkyl groups contain less than six carbon atoms and at least one alkyl group is a branched chain alkyl group and which is unsubstituted, except for sulfur, in two of the positions ortho and para to the hydroxy group.

10. The vulcanized rubber product obtained by heating a rubber and sulfur in the presence of a mono sulfide of an alkyl cresol in which said alkyl group is a branched chain containing less than six carbon atoms and which is unsubstituted, except for sulfur, in two of the positions ortho and para to the hydroxy group.

11. The vulcanized rubber product obtained by heating a rubber and sulfur in the presence of a monosulfide of a tertiary alkyl cresol which is unsubstituted, except for sulfur, in two of the positions ortho and para to the hydroxy group.

12. The vulcanized rubber product obtained by heating a rubber and sulfur in the presence of di(1-hydroxy 2-methyl 5-isopropyl phenyl) monosulfide.

13. The vulcanized rubber product obtained by heating a rubber and sulfur in the presence of di(1-hydroxy 3-methyl 4-tertiary butyl phenyl) monosulfide.

14. The vulcanized rubber product obtained by heating natural rubber and sulfur in the presence of a sulfide of a monohydric dialkyl phenol in which a carbon atom of each of two nuclei of the phenol are joined together by less than three sulfur atoms and the alkyl groups contain less than six carbon atoms and at least one alkyl group is a branched chain alkyl group and which is unsubstituted, except for sulfur, in two of the positions ortho and para to the hydroxy group.

15. The vulcanized rubber product obtained by heating natural rubber and sulfur in the presence of di(1-hydroxy 2-methyl 5-isopropyl phenyl) monosulfide.

16. The vulcanized rubber product obtained by heating natural rubber and sulfur in the presence of di(1-hydroxy 3-methyl 4-tertiary butyl phenyl) monosulfide.

17. The method of preserving a rubber which comprises treating a rubber with a sulfide of a monohydric dialkyl phenol possessing the structure

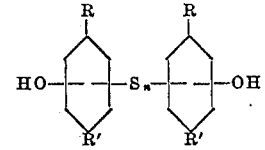

where R and R' are alkyl groups of less than six carbon atoms at least one alkyl group on each nucleus is a branched chain alkyl group and $n$ is an integer less than three.

18. The method of preserving a rubber which comprises treating a rubber with a sulfide of an alkyl cresol possessing the structure

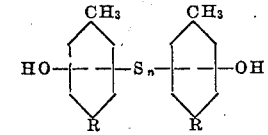

where R is a branched chain alkyl radical containing less than six carbon atoms and $n$ is an integer less than three.

19. The method of preserving a rubber which comprises treating a rubber with di(1-hydroxy 3-methyl 6-isopropyl phenyl) monosulfide.

20. The vulcanized rubber product obtained by heating a rubber and sulfur in the presence of a sulfide of a monohydric dialkyl phenol possessing the structure

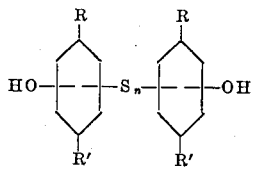

where R and R' are alkyl groups of less than six carbon atoms at least one alkyl group on each nucleus is a branched chain alkyl group and $n$ is an integer less than three.

21. The vulcanized rubber product obtained by heating a rubber and sulfur in the presence of a sulfide of an alkyl cresol possessing the structure

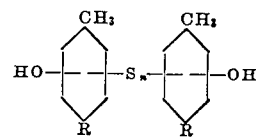

where R is a branched chain alkyl radical containing less than six carbon atoms and $n$ is an integer less than three.

22. The vulcanized rubber product obtained by heating a rubber and sulfur in the presence of di-(1-hydroxy 3-methyl 6-isopropyl phenyl) monosulfide.

DAVID J. BEAVER.